United States Patent
Howard, II et al.

(10) Patent No.: US 11,142,129 B2
(45) Date of Patent: Oct. 12, 2021

(54) VEHICLE FRONT TRUNK UTILITY SYSTEMS

(71) Applicant: FORD GLOBAL TECHNOLOGIES, LLC, Dearborn, MI (US)

(72) Inventors: Richard Lee Howard, II, Brighton, MI (US); Roger Hicks, Dearborn, MI (US); Mark McChesney, Saline, MI (US); Russell Allan Sims, Grosse Ile, MI (US); William K. Moore, West Bloomfield, MI (US); Ehab Naguib Kaoud, Canton, MI (US); Joshua Edward Brooker, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 84 days.

(21) Appl. No.: 16/544,232

(22) Filed: Aug. 19, 2019

(65) Prior Publication Data

US 2021/0053498 A1 Feb. 25, 2021

(51) Int. Cl.
*B60R 5/02* (2006.01)
*B60R 5/04* (2006.01)
*B60R 11/02* (2006.01)
*B60R 9/06* (2006.01)

(52) U.S. Cl.
CPC .............. *B60R 5/02* (2013.01); *B60R 5/04* (2013.01); *B60R 9/06* (2013.01); *B60R 11/0217* (2013.01); *B60Y 2200/141* (2013.01)

(58) Field of Classification Search
CPC .. B60R 5/02; B60R 5/04; B60R 5/041; B60R 9/06

USPC .......... 296/26.08, 146.8, 57.1; 224/402, 403, 224/400, 488, 489, 492, 494, 496, 513; 108/44

See application file for complete search history.

(56) References Cited

U.S. PATENT DOCUMENTS

| 3,338,620 | A | * | 8/1967 | Gauvin | ...................... | B60P 3/32 |
| | | | | | | 296/37.14 |
| 4,455,948 | A | | 6/1984 | Torres | | |
| 5,136,953 | A | * | 8/1992 | Schmidt | .................. | B60N 3/001 |
| | | | | | | 108/44 |
| 5,427,033 | A | * | 6/1995 | Bly | ........................ | B60N 3/002 |
| | | | | | | 108/44 |
| 5,479,866 | A | * | 1/1996 | Rae | ....................... | A47B 23/001 |
| | | | | | | 108/25 |

(Continued)

FOREIGN PATENT DOCUMENTS

| CN | 203832493 U | 9/2014 | |
| EP | 1029740 | * 8/2000 | ............... B60R 5/02 |

*Primary Examiner* — Dennis H Pedder
(74) *Attorney, Agent, or Firm* — David Coppiellie; Carlson, Gaskey & Olds (57) ABSTRACT

This disclosure details vehicle front trunk utility systems for increasing the usefulness of front truck cargo spaces. In exemplary embodiments, a vehicle front trunk utility system includes a utility table that may be deployed between a first configuration in which the utility table functions as a floor liner of a cargo space of the front trunk and a second configuration in which the utility table functions as a table-top or work space that extends away from the cargo space. The utility systems of this disclosure may additionally or alternatively include various other utility features including but not limited to storage compartments, lighting, battery and stereo interface panels, power outlets, etc.

15 Claims, 9 Drawing Sheets

(56) References Cited

U.S. PATENT DOCUMENTS

| | | | |
|---|---|---|---|
| 5,685,468 A * | 11/1997 | Hernandez | B60R 11/06 108/44 |
| 5,692,792 A | 12/1997 | Klar (minor) | |
| 5,992,331 A * | 11/1999 | Inoue | A47B 3/0912 108/132 |
| 6,575,517 B2 * | 6/2003 | Yamagishi | E05B 81/22 292/DIG. 43 |
| 6,824,183 B1 * | 11/2004 | Hodge | B60P 3/14 108/44 |
| 7,093,870 B2 * | 8/2006 | Kim | B60J 5/103 296/24.33 |
| 10,300,832 B1 | 5/2019 | Folks et al. | |
| 2013/0064393 A1 * | 3/2013 | Yamazaki | H04R 5/04 381/105 |
| 2014/0054339 A1 | 2/2014 | Smith | |
| 2014/0291056 A1 * | 10/2014 | Takanaga et al. | B60R 19/52 180/274 |
| 2017/0324189 A1 * | 11/2017 | Baughman | B60R 13/07 |

* cited by examiner

FIG. 15 the detailed description can be briefly described as follows.
VEHICLE FRONT TRUNK UTILITY SYSTEMS

TECHNICAL FIELD

This disclosure relates to vehicles that include front trucks, and more particularly to systems for expanding the utility and usefulness of vehicle front trunks.

BACKGROUND

Electrified vehicles are being developed to either reduce or completely eliminate the reliance on internal combustion engines. With the onset of electrified vehicles in the automotive market, many existing components in the vehicle engine compartment may become unnecessary. The excess room made available by the removal of these component allows for a front storage compartment, which is also known as a front trunk or "frunk." Front trunks are cargo spaces located in the front of the vehicle and are typically accessible by opening the hood of the vehicle.

SUMMARY

A vehicle according to an exemplary aspect of the present disclosure includes, among other things, a front trunk that establishes a cargo space that includes a floor, and a utility table movably positioned against the floor. In a first configuration, the utility table is configured as a floor liner of the floor. In a second configuration, the utility table is configured as a tabletop or work space that extends to a location outside of the cargo space.

In a further non-limiting embodiment of the foregoing vehicle, the vehicle includes a second cargo space located rearward of the cargo space.

In a further non-limiting embodiment of either of the foregoing vehicles, the vehicle is a pickup truck and the second cargo space is a truck bed.

In a further non-limiting embodiment of any of the foregoing vehicles, in the second configuration, a strut of the utility table is received within a bumper opening of the vehicle.

In a further non-limiting embodiment of any of the foregoing vehicles, the strut is connected to the utility table by a hinge bracket, a cable, or both.

In a further non-limiting embodiment of any of the foregoing vehicles, in the second configuration, a first bracket of the utility table interlocks with a second bracket of a front ledge of the front trunk.

In a further non-limiting embodiment of any of the foregoing vehicles, the utility table includes a cup holder, a storage tray, or both.

In a further non-limiting embodiment of any of the foregoing vehicles, the utility table includes a plurality of embossings that establish a ruler.

In a further non-limiting embodiment of any of the foregoing vehicles, a storage compartment is formed in the floor. The storage compartment includes a pocket and a lid that is movable to cover the pocket.

In a further non-limiting embodiment of any of the foregoing vehicles, a wireless speaker is storable within the pocket.

In a further non-limiting embodiment of any of the foregoing vehicles, a stereo interface panel is mounted within the front trunk, a battery interface panel is mounted within the front trunk, or both.

In a further non-limiting embodiment of any of the foregoing vehicles, the front trunk includes a tub insert that includes a sidewall extending upwardly from the floor. A lighting assembly, a power outlet, or both are mounted to the sidewall.

A vehicle according to another exemplary aspect of the present disclosure includes, among other things, a front trunk establishing a cargo space that includes a floor, a storage compartment located in the floor, and a speaker removably stored in a pocket of the storage compartment. In a first positon, the speaker is stored within the pocket. In a second position, the speaker is removed from the pocket and is positioned at a different location of the front trunk.

In a further non-limiting embodiment of the foregoing vehicle, the vehicle is battery electric powered pickup truck.

In a further non-limiting embodiment of either of the foregoing vehicles, the battery electric powered pickup truck includes a truck bed that establishes a second cargo space that is rearward of the cargo space.

In a further non-limiting embodiment of any of the foregoing vehicles, a battery interface panel is mounted within the front trunk.

In a further non-limiting embodiment of any of the foregoing vehicles, a stereo interface panel is mounted within the front trunk.

In a further non-limiting embodiment of any of the foregoing vehicles, a utility table is movably positioned against the floor. In a first configuration, the utility table is configured as a floor liner of the floor. In a second configuration, the utility table is configured as a tabletop or work space that extends to a position outside of the front trunk.

In a further non-limiting embodiment of any of the foregoing vehicles, in the second configuration, a strut of the utility table is received within a bumper opening of the vehicle.

In a further non-limiting embodiment of any of the foregoing vehicles, in the second configuration, a first bracket of the utility table interlocks with a second bracket of a front ledge of the front trunk.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle front trunk utility systems for increasing the usefulness of front truck cargo spaces. In exemplary embodiments, a vehicle front trunk utility system includes a utility table that may be deployed between a first configuration in which the utility table functions as a floor liner of a cargo space of the front trunk and a second configuration in which the utility table functions as a tabletop or work space that extends away from the cargo space. The utility systems of this disclosure may additionally or alternatively include various other utility features including but not limited to storage compartments, lighting, battery and stereo interface panels, power outlets, etc. These and other features of this disclosure are described in greater detail in the following paragraphs of this detailed description.

Figure 1:
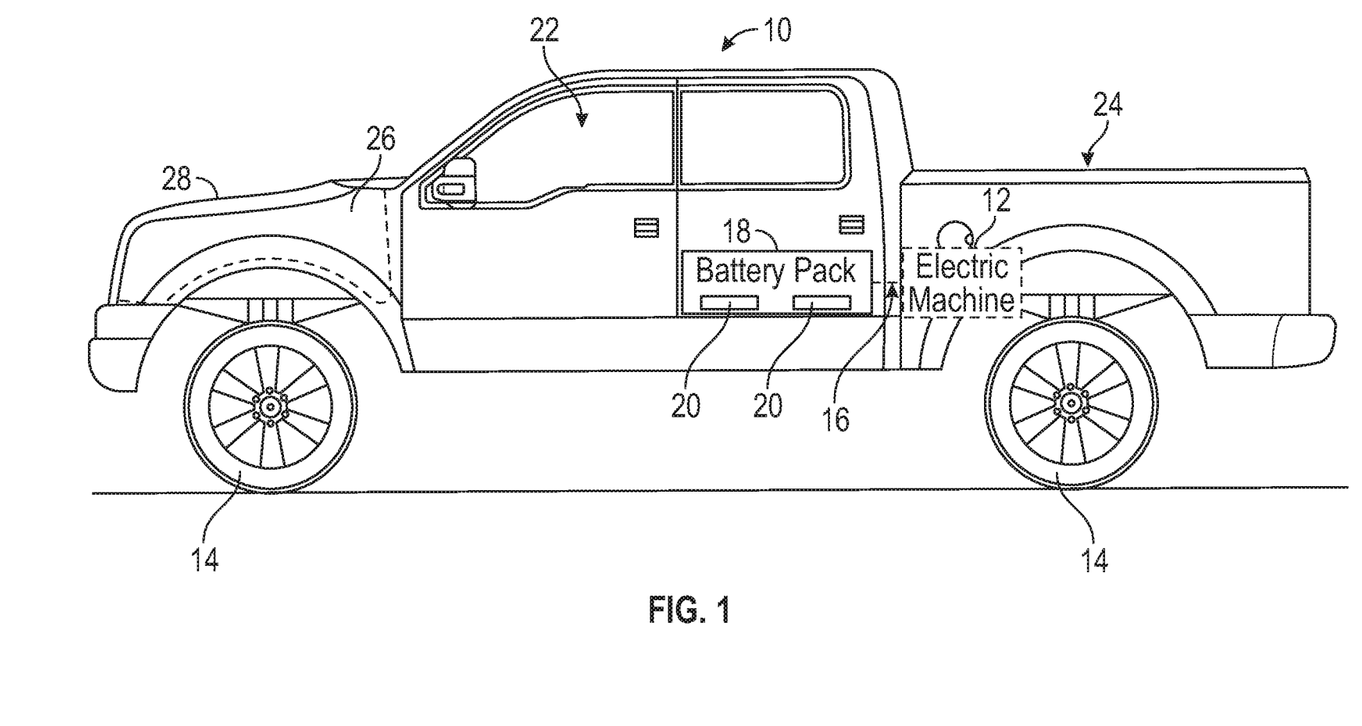
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, plug-in hybrid electric vehicles (PHEV's), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to show certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

In an embodiment, the electrified vehicle 10 is a pickup truck. However, the electrified vehicle 10 could also be a car, a van, a sport utility vehicle, or any other type of vehicle.

In an embodiment, the electrified vehicle 10 includes a passenger cabin 22, a truck bed 24 located to the rear of the passenger cabin 22, and a front trunk 26 located to the front of the passenger cabin 22. The truck bed 24 may establish a first cargo space of the electrified vehicle 10, and the front trunk 26 may establish a second cargo space of the electrified vehicle 10. The front trunk 26 may be referred to more broadly as a front cargo space or by the portmanteau "frunk."

The front trunk 26 may provide an additional cargo space not traditionally available in conventional internal combustion powered vehicles. The owner or user of the electrified vehicle 10 may therefore wish to maximize the utility of the front trunk 26. Utility systems for improving the overall usefulness of the front trunk 26 are therefore proposed in this disclosure.

The front trunk 26 may be covered by a front hood 28 of the electrified vehicle 10. The front trunk 26 is shown covered by the front hood 28 in FIG. 1 and is shown uncovered by the front hood 28 in FIGS. 2-5. The front hood 28 may be a hinged cover which, when closed, substantially encloses the front trunk 26, and when moved open, provides access to the front trunk 26.

Figure 2:
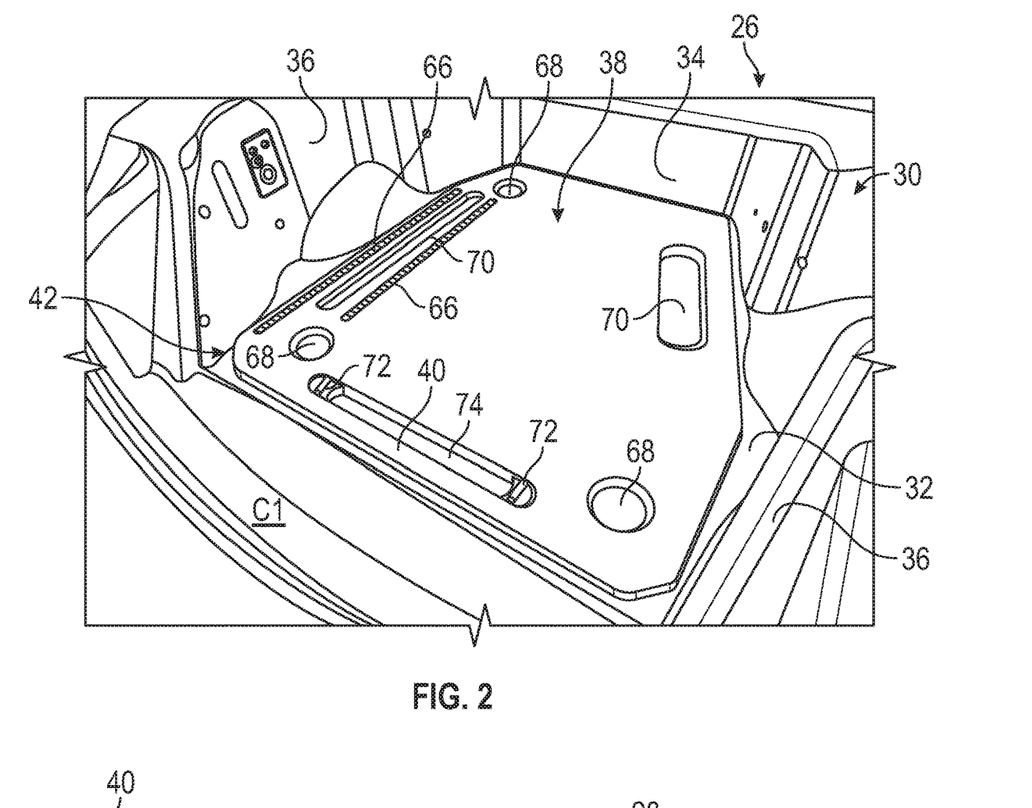
FIG. 2 illustrates a front trunk of the electrified vehicle of FIG. 1. A utility table of the front trunk is shown in a first, or stowed, configuration in FIG. 2.

Referring to FIG. 2, the front trunk 26 includes a tub insert 30 that substantially lines the front trunk 26 for establishing a front cargo space of the electrified vehicle 10. The tub insert 30 may be monolithic structure that establishes a floor 32, a rear wall 34, and side walls 36 of the front trunk 26. The rear wall 34 and the side walls 36 may protrude upwardly from the floor 32. A front opening 42 of the tub insert 30 provides access to the front trunk 26 when the front hood 28 is moved to the open position.

In an embodiment, the tub insert 30 is constructed of a polymeric material. However, other materials, including metallic materials, are also contemplated within the scope of this disclosure.

A utility table 38 may be movably positioned against the floor 32 of the front trunk 26. FIG. 2 illustrates a first configuration C1 (i.e., a stowed position) of the utility table 38. In the first configuration C1, the utility table 38 may be configured as a floor liner of the floor 32. Various cargo items (not shown) may be positioned atop the utility table 38 when it is positioned in the first configuration C1.

The utility table 38 may be free floating relative to the floor 32. In other words, the utility table 38 is not physically mounted to the floor 32 nor connected via any complex linkages, hinges, rails, etc. The utility table 38 described herein can simply be slid in and out of the front trunk 26 by sliding the utility table along the floor 32.

Figure 3:
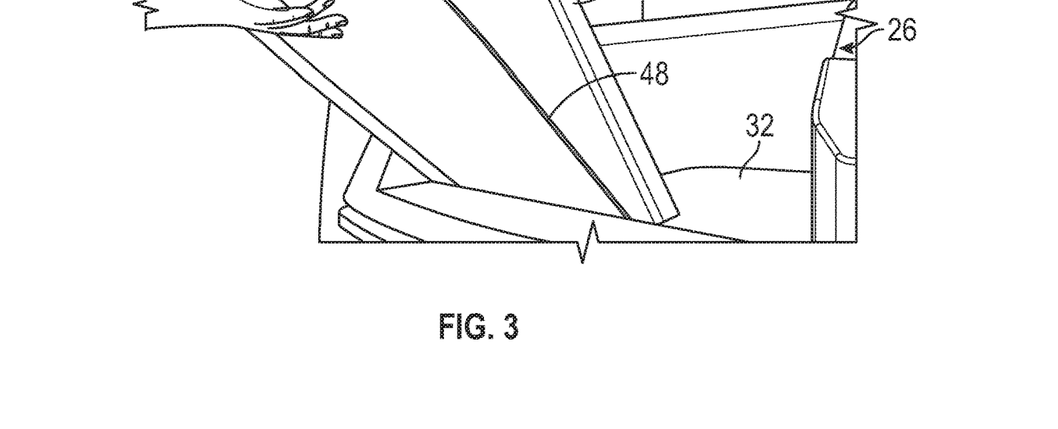
FIG. 3 schematically illustrates deployment of the utility table of FIG. 2 from the first configuration toward a second, or deployed, configuration.
Figure 4:
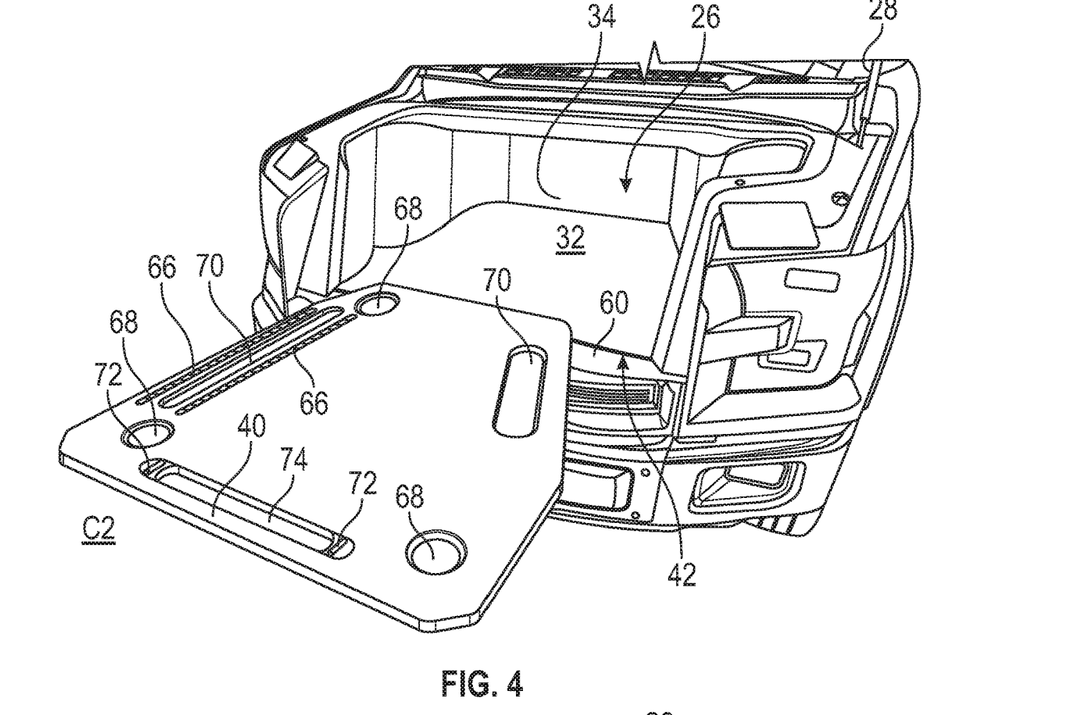
FIG. 4 illustrates the deployed configuration of the utility table shown in FIGS. 2 and 3.

FIGS. 3 and 4 schematically illustrate the deployment of the utility table 38 from the first configuration C1 shown in FIG. 2 to a second configuration C2 (i.e., a deployed position) shown in FIG. 4. The floor 32 is substantially uncovered by the utility table 38 when the utility table 38 is positioned in the second configuration C2.

The utility table 38 may be grasped at a handle 40 and then pulled at an upward angle relative to the floor 32 (see FIG. 3) in order to position the utility table 38 in the second configuration C2 of FIG. 4. In the second configuration C2, the utility table 38 may extend outwardly forward from the front opening 42 of the front trunk 26 (e.g., in a direction opposite from the rear wall 34) and may function as a tabletop or work space. For example, the utility table 38 could be used as a work bench, a desk, a picnic table, a tailgating area, etc. when positioned in the second configuration C2.

Figure 5:
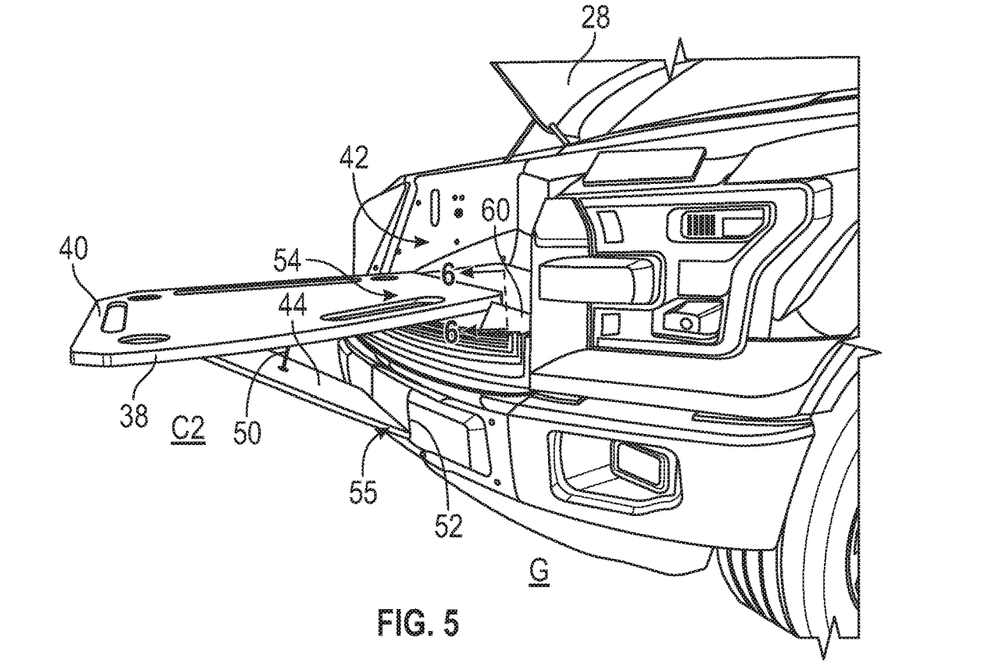
FIG. 5 is a side view of the utility table of FIG. 3 in the deployed configuration.
Figure 6:
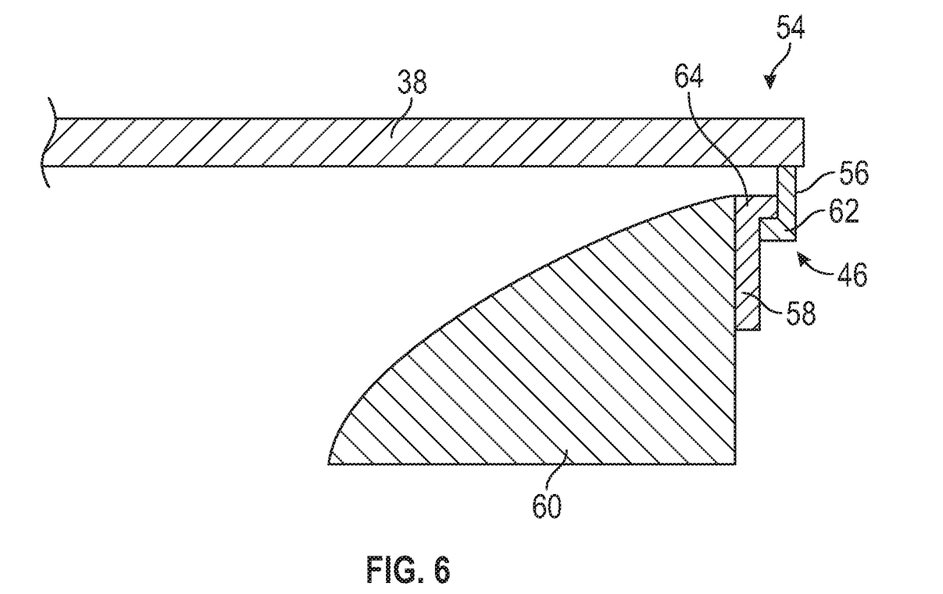
FIG. 6 is a cross-sectional view through section 6-6 of FIG. 5 and illustrates a retaining bracket assembly of the utility table.

Referring now primarily to FIGS. 5-6, the utility table 38 may be retained in the second configuration C2 by a combination of a strut 44 and a retaining bracket assembly 46. Once the utility table 38 has been moved a far enough distance outwardly from the front opening 42 of the front trunk 26, the strut 44 may automatically release from its stowed position within a pocket 48 (see FIG. 3) of the utility table 38. The strut 44 may be connected to the utility table 38 by a hinge bracket 49 (see FIG. 3) and a cable 50 (see FIG. 5). A distal end 55 of the strut 44 may be positioned in a bumper opening 52 in order to cantilever the utility table 38 relative to the front trunk 26. When engaged within the bumper opening 52, the strut 44 holds the utility table 38 so it is substantially parallel to a ground surface G upon which the electrified vehicle 10 is positioned. Advantageously, no portion of the utility table 38 is required to contact the ground surface G in order to retain the utility table 38 in the second configuration C2.

A rear side 54 of the utility table 38 may be secured in place by the retaining bracket assembly 46. As best shown in FIG. 6, for example, the retaining bracket assembly 46 may include a first bracket 56 attached to the rear side 54 of the utility table 38 and a second bracket 58 attached to a front ledge 60 of the front trunk 26. In an embodiment, the first bracket 56 and the second bracket 58 are L-shaped brackets. A flange 62 of the first bracket 56 may interlock with a flange 64 of the second bracket to secure the rear side 54 of the utility table 38 in place when the utility table 38 is moved to the second configuration C2, thereby substantially preventing the rear side 54 from being moved too far outwardly from the front trunk 26.

Figure 7:
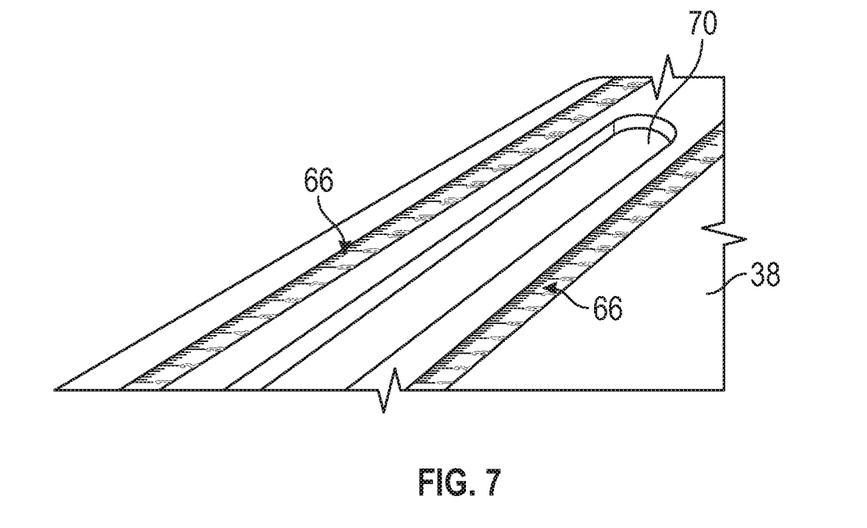
FIG. 7 illustrates embossing features of the utility table of FIGS. 2-6.
Figure 8:
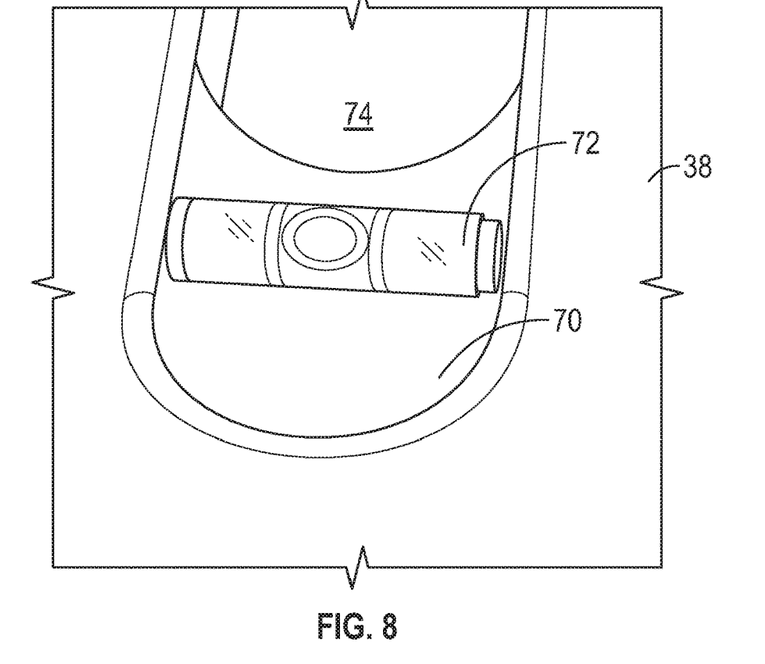
FIG. 8 illustrates additional features of the utility table of FIGS. 2-6.

The utility table 38 described above may include a variety of functional features designed to provide additional utility and convenience to the user. For example, the utility table 38 may be equipped with a plurality of embossings 66. The embossings 66 may establish one or more measurement rulers (see, e.g., FIGS. 2, 4, and 7) for measuring items when positioned atop the utility table 38. The utility table 38 may additionally include one or more cup holders 68, storage trays 70, and levels 72 (see, e.g., FIGS. 2, 4 and 8).

In another embodiment, an elongated opening 74 is formed through the utility table 38. The elongated opening 74 accommodates a user's hand when the user grasps the handle 40 (see, e.g., FIG. 3) for moving the utility table 38 from the first configuration C1 to the second configuration C2 or from the second configuration C2 back to the first configuration C1.

FIGS. 9-15 illustrate additional utility system features that can be incorporated into the front trunk 26 in order to increase its usefulness and utility. The features shown in FIGS. 9-15 may be provided either in place of or in addition to the utility table 38 described above.

Figure 9:
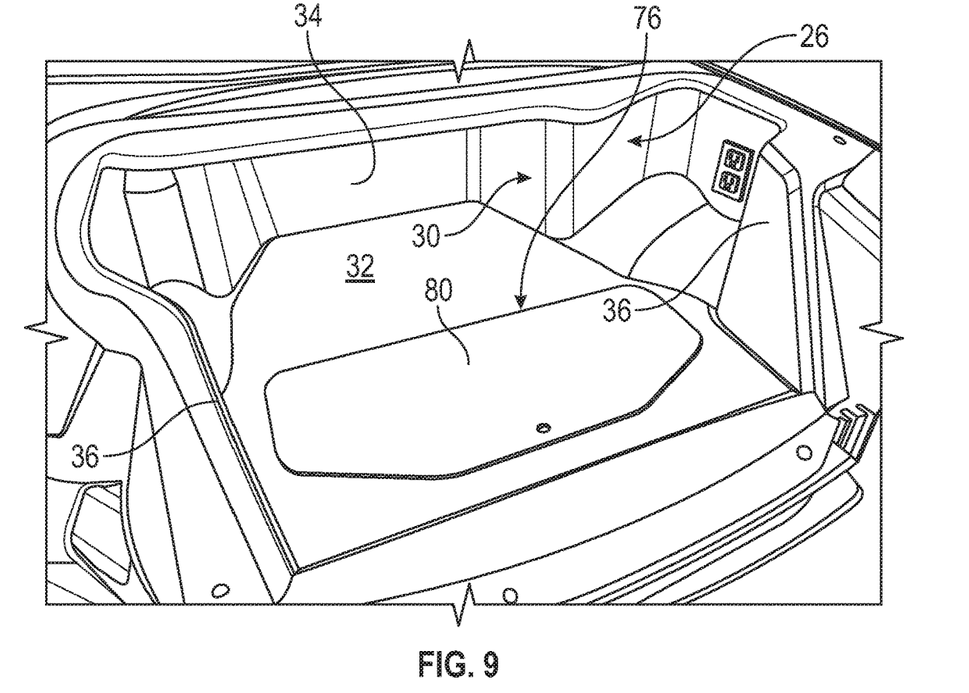
FIG. 9 illustrates the front trunk of FIG. 2 with the utility table removed.
Figure 10:
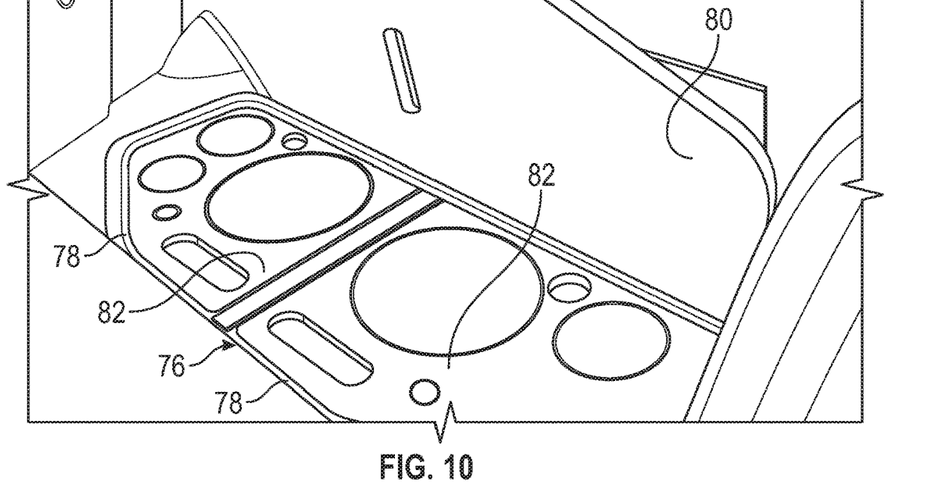
FIG. 10 illustrates a storage compartment of the front trunk of FIG. 9.
Figure 11:
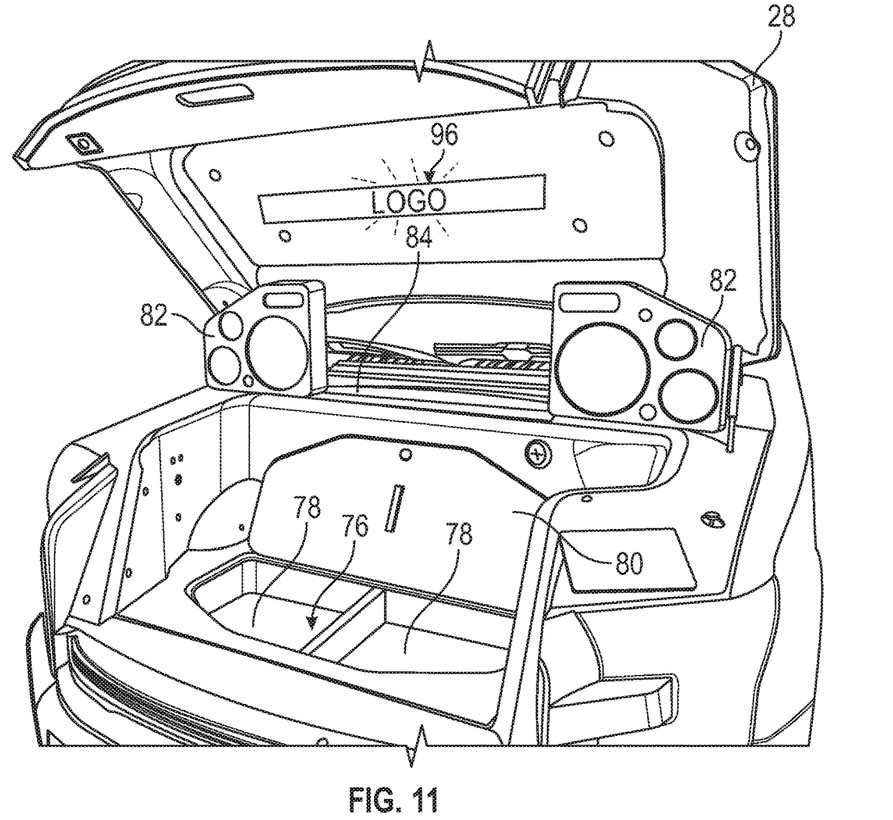
FIG. 11 illustrates an exemplary use of the front trunk of FIGS. 9-10.

FIGS. 9-11 illustrate the front trunk 26 with the utility table 38 removed for clarity. The floor 32 of the front trunk 26 may include a storage compartment 76. In an embodiment, the storage compartment 76 includes one or more pockets 78 that are recessed below an outer surface of the floor 32. The pockets 78 of the storage compartment 76 may covered by a lid 80. The storage compartment 76 of the front trunk 26 may be utilized to store cargo. In the illustrated embodiment, for example, a speaker 82 is positionable within each of the pockets 78. In an embodiment, the speakers 82 are wireless speakers. The speakers 82 may be removed from the pockets 78 and positioned at an upper rear ledge 84 of the front trunk 26 (see, e.g., FIG. 11), or at any other location, when a user desires to listen to music or other audio during tailgating, work, or other activities.

Figure 12:
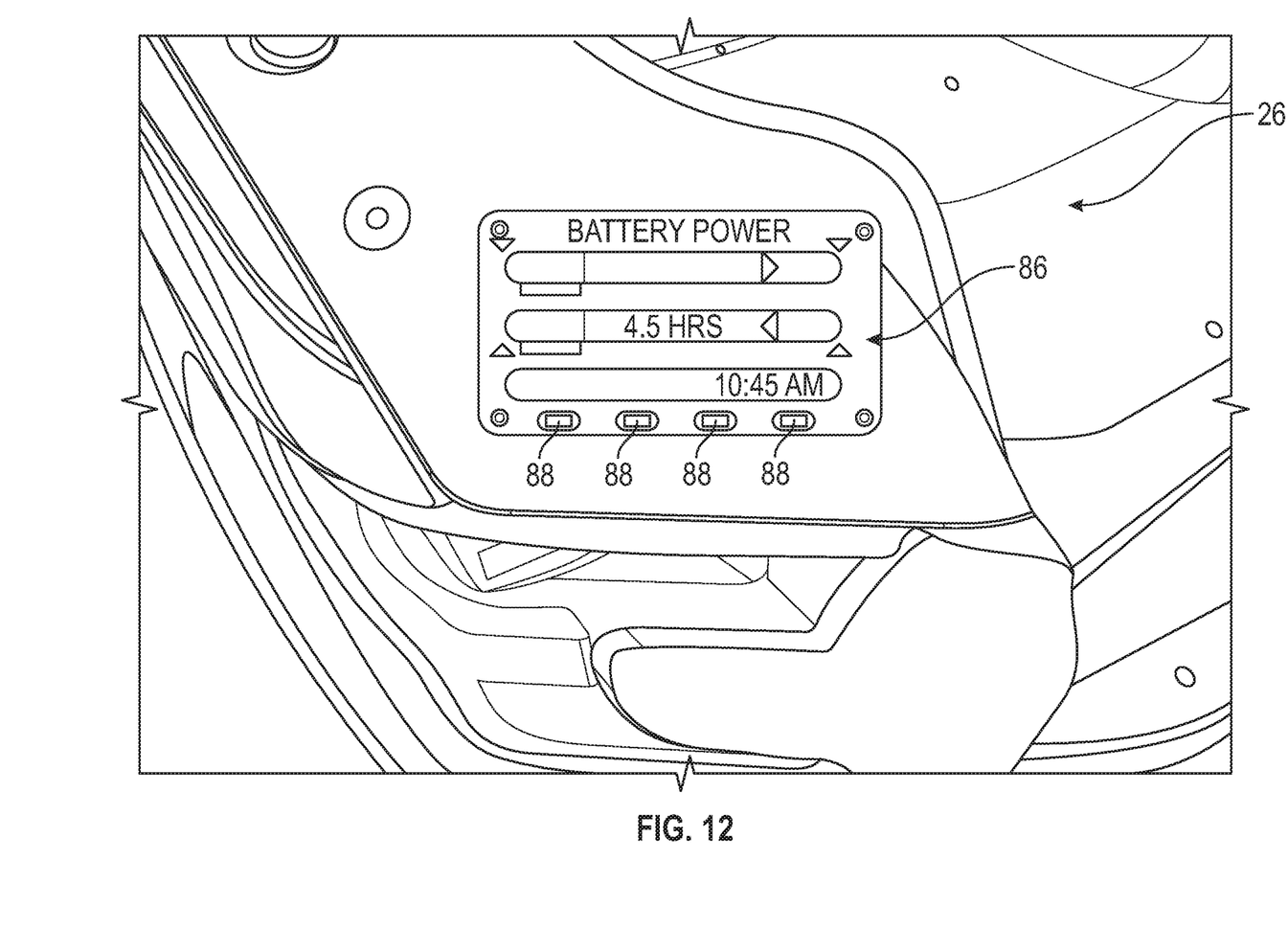
FIG. 12 illustrates a battery interface panel of a front trunk.

FIG. 12 illustrates an exemplary battery interface panel 86 that can be mounted within or near the front trunk 26. The actual mounting location of the battery interface panel 86 relative to the front trunk 26 is not intended to limit this disclosure.

The battery interface panel 86 may provide the user with up-to-date information about the battery pack 18 of the electrified vehicle 10. Examples of the type of information that may be displayed on the battery interface panel 86 include but are not limited to, current state of charge of the battery pack 18, amount of time left before the battery pack 18 charge is depleted, power out, power in, etc. The battery interface panel 86 may include various input ports 88, such as USB ports, for plugging peripheral devices (e.g., smart phones, etc.) into the battery interface panel 86.

Figure 13:
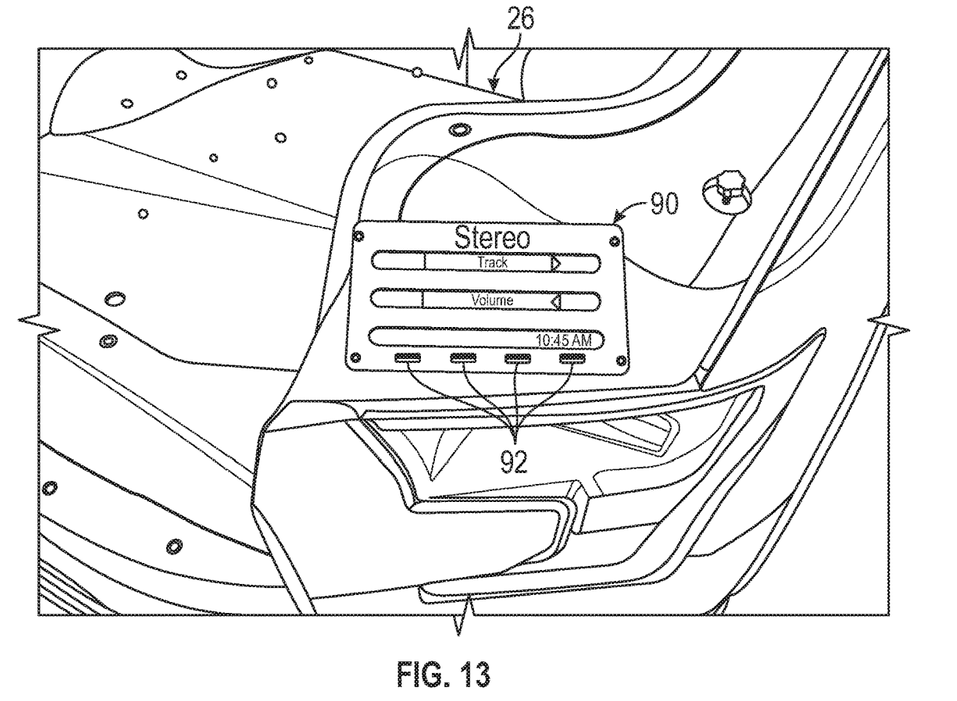
FIG. 13 illustrates a stereo interface panel of a front trunk.

FIG. 13 illustrates an exemplary stereo interface panel 90 that can be mounted within or near the front trunk 26. The actual mounting location of the stereo interface panel 90 relative to the front trunk 26 is not intended to limit this disclosure.

The stereo interface panel 90 may display various radio/stereo/music related playback information to the user. Examples of the type of information that may be displayed on the stereo interface panel 90 include but are not limited to current song title, power ON or Off status, volume level, etc. The stereo interface panel 90 may include various input ports 92, such as USB ports, for plugging peripheral devices (e.g., smart phones, etc.) into the stereo interface panel 90. In an embodiment, the stereo interface panel 90 is configured to wirelessly connect to the speakers 82 of FIGS. 10-11, such as by using a Bluetooth wireless technology standard or some other wireless connection technology.

Figure 14:
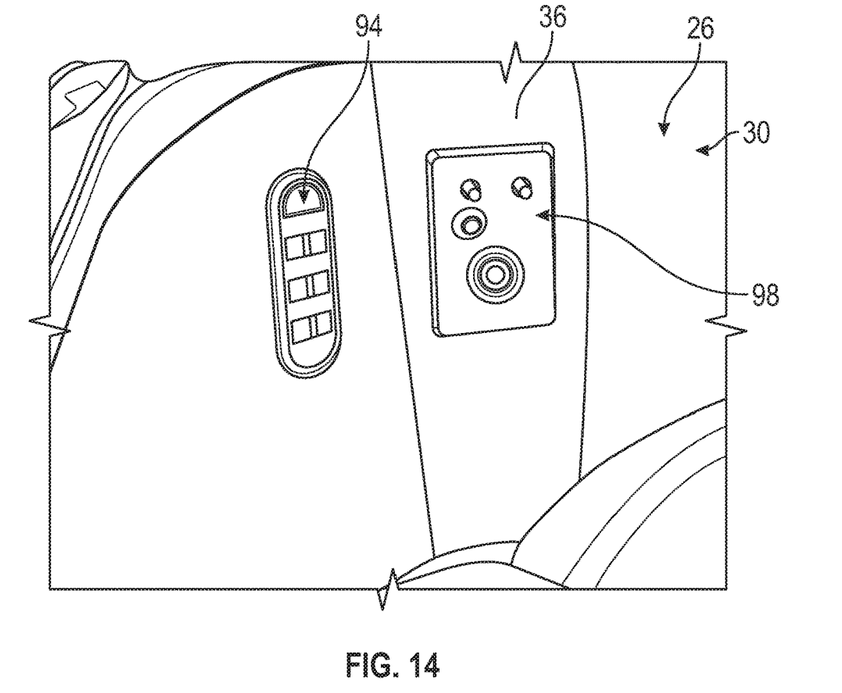
FIG. 14 illustrates lighting and battery connection features of a front trunk.

Referring to FIG. 14, the front trunk 26 may be equipped with various lighting assemblies 94 for selectively illuminating the front trunk 26. In an embodiment, one or more lighting assemblies 94 may be mounted within each side wall 36 of the tub insert 30 of the front trunk 26. A logo 96 (e.g., word, phrase, and/or symbol) that is mounted to an interior surface of the front hood 28 may include task lighting for illuminating the front trunk 26 (see, e.g., FIG. 11).

The front trunk 26 may additionally include a battery connection port 98. The battery connection port 98 may be used to charge the battery pack 18 of the electrified vehicle 10, such as by connecting a charging cable, for example.

Figure 15:
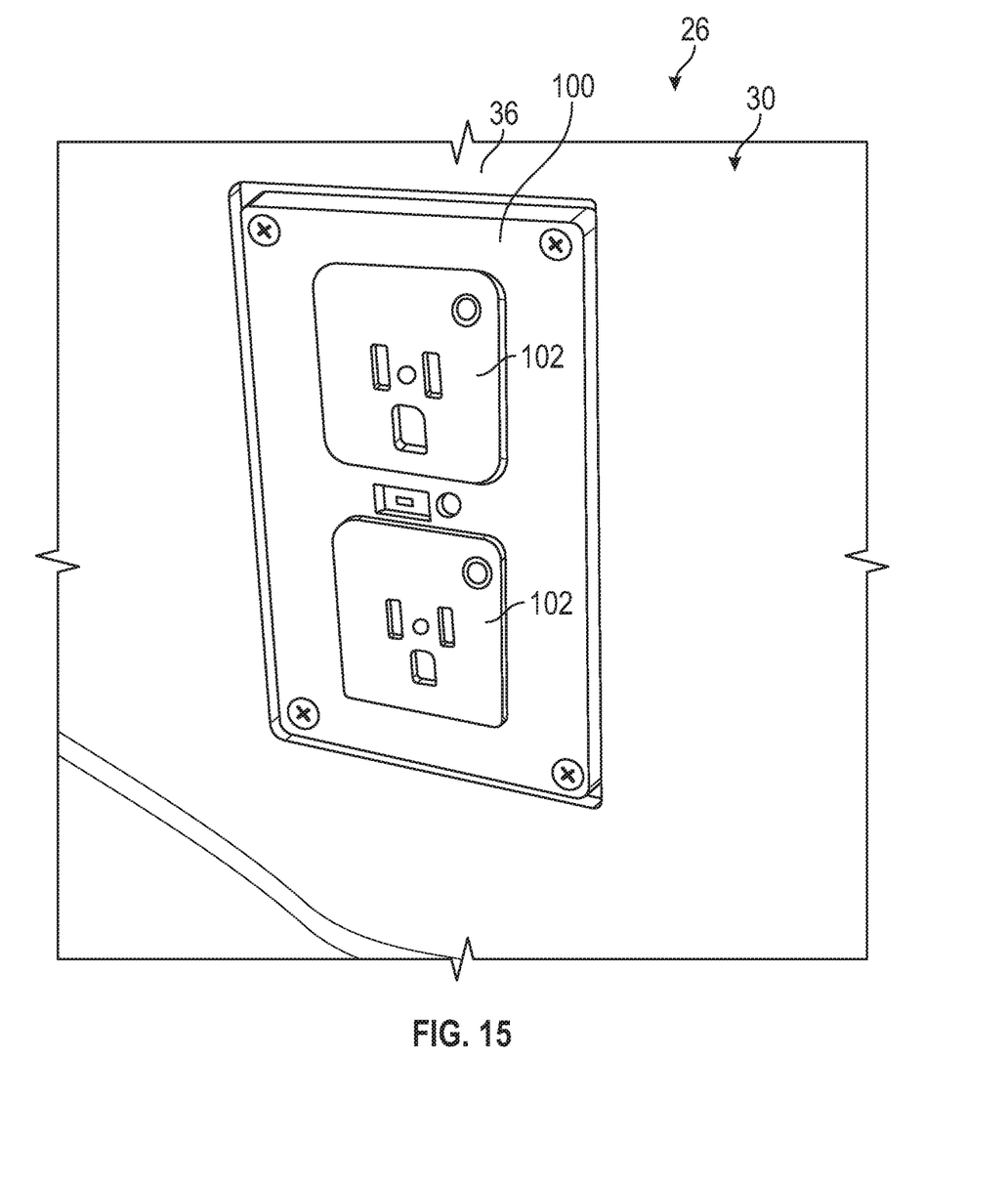
FIG. 15 illustrates a power outlet of a front trunk.

Referring to FIG. 15, the front trunk 26 may additionally be equipped with one or more power outlets 100. The power outlets 100 may include one or more ports 102 for connecting peripheral devices (e.g., heaters, power tools, video equipment, etc.) to the electrified vehicle 10 when utilizing the front trunk 26. The ports 102 may include both 120 V and 240 V outlet ports, in an embodiment.

The utility systems of this disclosure provide users with the ability to maximize the utility and usefulness of electrified vehicle front trunk cargo spaces. The utility systems may incorporate various features or combinations of features, including but not limited to, deployable utility tables, storage compartments, lighting, battery and stereo interface panels, power outlets, etc.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
a front trunk establishing a first cargo space that includes a floor;
a truck bed establishing a second cargo space;
a passenger cabin that separates the second cargo space from the first cargo space; and
a utility table movably positioned against the floor of the first cargo space,
wherein, in a first configuration, the utility table establishes a floor liner of the floor,
wherein, in a second configuration, the utility table is configured as a tabletop or work space that extends to a location outside of the first cargo space,
wherein the utility table includes a strut that is movable between a stowed position within a pocket of the utility table and an extended position in which a distal end of the strut is configured to engage a bumper opening of the vehicle when the utility table is moved to the second configuration,
wherein the utility table includes a retaining bracket assembly configured secure the utility table to a front ledge of the front trunk when the utility table is moved to the second configuration,
wherein the retaining bracket assembly includes a first L-shaped bracket attached to the utility table and adapted to engage a second L-shaped bracket that is attached to the front ledge.

2. The vehicle as recited in claim 1, wherein the second cargo space is located rearward of the first cargo space.

3. The vehicle as recited in claim 1, wherein the vehicle is a pickup truck.

4. The vehicle as recited in claim 1, wherein the strut is connected to the utility table by a hinge bracket, a cable, or both.

5. The vehicle as recited in claim 1, wherein the utility table includes a cup holder, a storage tray, or both.

6. The vehicle as recited in claim 1, wherein the utility table includes a plurality of embossings that establish a ruler.

7. The vehicle as recited in claim 1, comprising a storage compartment formed in the floor, wherein the storage compartment includes a pocket and a lid that is movable to cover the pocket.

8. The vehicle as recited in claim 7, comprising a wireless speaker storable within the pocket.

9. The vehicle as recited in claim 1, comprising a stereo interface panel mounted within the front trunk, a battery interface panel mounted within the front trunk, or both.

10. The vehicle as recited in claim 1, wherein the front trunk includes a tub insert that includes a sidewall extending upwardly from the floor, wherein a lighting assembly, a power outlet, or both are mounted to the sidewall.

11. The vehicle as recited in claim 1, wherein, in the first configuration, the utility table is free floating relative to the floor and includes a substantially flat top surface adapted for establishing the floor liner.

12. The vehicle as recited in claim 11, wherein a first shape of the utility table mimics a second shape of the floor of the cargo space.

13. The vehicle as recited in claim 1, wherein the utility table includes a handle that is at least partially established by an elongated opening formed through the utility table.

14. The vehicle as recited in claim 1, wherein the utility table includes a cup holder and a level.

15. The vehicle as recited in claim 1, wherein the front trunk comprises a tub insert that includes a monolithic structure that establishes the floor, a rear wall, and side walls of the front trunk.

* * * * *